United States Patent [19]

Yamaoka et al.

[11] Patent Number: 4,460,622
[45] Date of Patent: Jul. 17, 1984

[54] ELECTROCONDUCTIVE PASTE TO BE BAKED ON CERAMIC BODIES TO PROVIDE CAPACITORS, VARISTORS OR THE LIKE

[75] Inventors: Nobutatsu Yamaoka, Harunamachi; Kazuo Sasazawa, Maebashi, both of Japan

[73] Assignee: Taiyo Yuden Co., Ltd., Tokyo, Japan

[21] Appl. No.: 501,210

[22] Filed: Jun. 6, 1983

Related U.S. Application Data

[62] Division of Ser. No. 349,310, Feb. 16, 1982, abandoned.

[30] Foreign Application Priority Data

Feb. 27, 1981 [JP] Japan ................................. 56-27880

[51] Int. Cl.³ .............................................. H01G 1/01
[52] U.S. Cl. ........................................ 427/79; 427/80;
427/101; 427/102; 427/103; 427/123;
427/376.6; 427/383.5; 338/21; 361/305;
361/320; 252/512
[58] Field of Search ................. 427/79, 80, 101, 102,
427/103, 123, 376.6, 383.5; 361/305, 320;
338/21; 252/512

[56] References Cited

U.S. PATENT DOCUMENTS

| | | | |
|---|---|---|---|
| 3,725,836 | 4/1973 | Wada et al. | 338/21 |
| 3,796,582 | 3/1974 | Leahey | 106/1 |
| 3,817,905 | 6/1974 | Lerner | 260/37 |
| 3,832,204 | 8/1974 | Boaz | 106/287 |
| 4,097,911 | 6/1978 | Dorrian | 361/305 |
| 4,138,369 | 2/1979 | Arai et al. | 252/512 |
| 4,168,519 | 9/1979 | Hertz | 427/79 |

FOREIGN PATENT DOCUMENTS

650584 7/1964 Belgium .

Primary Examiner—Michael R. Lusignan
Assistant Examiner—Richard Bueker
Attorney, Agent, or Firm—Woodcock, Washburn, Kurtz, Mackiewicz & Norris

[57] ABSTRACT

An electroconductive paste consists essentially of 100 parts by weight of zinc in finely divided form, from about 0.01 to 15.00 parts by weight of an organic titanium compound such as, typically, tetrakisstearoxytitanium, and a vehicle, such as alpha-terpineol containing ethylcellulose as an organic binder, for pasting the mixture of the zinc powder and the organic titanium compound. The paste may contain an additive or additives such as the oxides of some metallic elements. By being baked on ceramic bodies at a temperature above the melting point of zinc, the paste forms conductors or electrodes of ceramic capacitors, varistors or the like. The conductors or electrodes thus prepared from the zinc paste are approximately equivalent in electrical and mechanical properties to those fabricated from the familiar silver paste.

7 Claims, 5 Drawing Figures

ELECTROCONDUCTIVE PASTE TO BE BAKED ON CERAMIC BODIES TO PROVIDE CAPACITORS, VARISTORS OR THE LIKE

This is a division of application Ser. No. 349,310, filed Feb. 16, 1982, now abandoned.

This invention relates to a novel electroconductive composition in paste form, and more specifically to such an electroconductive paste suitable for use as conductors or electrodes by being baked on ceramic bodies to provide electrical components such as capacitors and varistors.

As is well known, in the fabrication of ceramic capacitors or ceramic varistors, the conductors or electrodes are formed by coating electroconductive pastes on ceramic bodies and by baking the coatings. Typical of such pastes as heretofore used for the purposes is known as a silver paste, composed of powdered silver, glass frit, and a vehicle or the liquid ingredient or ingredients of the paste. The silver paste is per se an excellent material for the purposes. When used for the conductors of ceramic capacitors, for example, it provides desired capacitance, dielectric loss tangent (the tangent of the dielectric loss angle $\delta$, tan $\delta$), and the tensile strength of the conductors against detachment from the ceramic bodies. Offsetting all these advantages, however, is the expensiveness of silver, a precious metal, which adds tremendously to the costs of the electrical components in question.

The present invention solves the problem of the prior art by providing a materially less expensive substitute for the silver paste. Although inexpensive, the electroconductive paste in accordance with the invention affords the desired electrical properties in their intended uses as the conductors or electrodes of ceramic capacitors, ceramic varistors or the like. Further the conductive regions made of the inventive paste adhere to the ceramic bodies with sufficient strength.

Stated broadly, the electroconductive paste in accordance with the invention is composed of 100 parts by weight of zinc powder, from about 0.01 to 15.00 parts by weight of an organic titanium compound, and a vehicle for pasting the mixture of the zinc powder and the organic titanium compound. As required or desired, the paste may contain an additive or additives which for the best results are selected from among the oxides of such metallic elements as lead, bismuth, praseodymium, copper, and cadmium.

The zinc paste, as the electroconductive paste in accordance with the invention will hereinafter be so called for simplicity, is not just a cheap substitute for the silver paste. When the zinc paste is used as the conductors of strontium titanate ceramic semiconductor capacitors, for example, by being baked on the ceramic bodies, the capacitance of the capacitors is higher than that of conventional capacitors having their conductors made from the silver paste. Thus the zinc paste can reduce the size of capacitors of this class for a given capacitance. To give another example, titanium dioxide ceramic varistors with their electrodes made from the zinc paste are just as excellent in electrical and mechanical properties as those having the conventional silver electrodes. Both of the above noted applications of the zinc paste will be discussed in more detail in the subsequent disclosure of specific Examples.

Among the advantages offered by the zinc paste is that it admits of baking in atmosphere. This is because, filling the interstices of the zinc powder, the organic titanium compound contained therein limits the oxidation of the individual zinc particles during baking. For this reason the electrical ceramic components with the zinc conductors or electrodes in accordance with the invention are mass producible at reduced costs. As regards the inexpensiveness of the zinc paste itself, suffice it to say that powdered zinc is available at approximately 1/200 the cost of powdered silver.

The above and other features and advantages of this invention and the manner of attaining them will become more apparent, and the invention itself will best be understood, from a study of the following detailed description taken together with the attached drawings, in which.

The zinc powder constituting the principal ingredient of the zinc paste of this invention is preferably of spherical particles, with a size of not more than about 15 microns for the best results. In practice the particle size may range from 0.1 to 30.0 microns.

From about 0.01 to 15.00 parts by weight, preferably from one to five parts by weight, of an organic titanium compound is admixed with zinc powder. Should the proportion of the organic titanium compound be less than about 0.01 weight part, the compound would hardly perform its intended functions as inorganic binder and oxidation inhibitor (later explained in detail) and would give rise to fluctuations in some physical properties of the zinc paste on mass production. If the proportion of the organic titanium compound exceeded about 15 weight parts, on the other hand, then the resulting paste when baked and used as conductors or electrodes on ceramic bodies would offer too high electrical resistance.

A preferred example of organic titanium compound suitable for admixture with zinc powder is the powder of tetrakisstearoxytitanium, $Ti(OC_{17}H_{35})_4$. Additional examples adoptable in the practice of the invention include tetrabutoxytitanium, $Ti(O-C_4H_9)_4$; di-n-butoxydibenzyltitanium, $Ti(n-C_4H_9O)_2(CH_2C_6H_5)_2$; di-i-propoxybisacetylacetonatetitanium, $Ti(O-iC_3H_7)_2[OC(CH_3)CHCOCH_3]_2$; di-n-butoxybistriethanolaminatetitanium, $Ti(O-nC_4H_9)_2[OC_2H_4N(C_2H_4OH)_2]_2$; and dihydroxybislactetetitanium, $Ti(OH)_2[OCH(CH_3)COOH]_2$. In short the invention allows the use of any organic titanium compound which, when the zinc paste is baked in a temperature range of 500° to 900° C., will decompose to provide a titanium oxide.

Examples of such compounds are the chelates or esters of titanic acid having the general formula, $Ti(OR)_4$, where R is an alkyl or aryl radical.

Organic titanium compounds for use in the zinc paste of this invention may be of either powder or liquid form. In the use of a compound in powder form the particle size should not exceed 30 microns for the best results. If the selected compound is used in the form of a solution, on the other hand, with toluene, benzene, or isopropyl alcohol, etc., used as a solvent, then the proportion of the organic titanium compound with respect to the solvent should preferably be from 0.01 to 15.00 parts by weight. The solvent used in the solution of the organic titanium compound serves also to paste its mixture with zinc powder, so that a solvent contained in the vehicle for pasting the mixture is to be decreased by an amount corresponding to that of the solvent in the organic titanium compound solution.

Preferred examples of the vehicle for pasting the mixture of zinc powder and an organic titanium compound is alpha-terpineol containing from two to 20 weight % ethylcellulose as an organic binder, or that containing from two to 20 weight % nitrocellulose or polyvinyl alcohol. Instead of alpha-terpineol as a solvent there may be employed butyl "Carbitol" (trademark for diethylene glycol mono-n-butyl ether), butyl "Carbitol" acetate (trademark for diethylene glycol mono-n-butyl ether acetate), or dioctyl phthalate.

Whichever substance is employed, the vehicle will evaporate when the zinc paste is baked on ceramic bodies to provide conductive regions, and so is substantially absent from the completed conductors or electrodes of the electrical components. Thus a wide variety of known organic vehicles lend themselves for use as a pasting agent within the scope of the invention. Any selected vehicle is to be used in an amount suitable for pasting the zinc mixture. The amount of the vehicle normally ranges from 10 to 50 weight %, preferably from 15 to 25 weight %, and most desirably from 19 to 21 weight %, of the combined weight of the blended zinc powder and organic titanium compound, together with or without an additive or additives to be referred to subsequently. The viscosity of the paste would become too high if the amount of the vehicle were less than 10 weight %, and too low if the amount were more than 50 weight %.

Such being the basic composition of the zinc paste in accordance with the invention, it will now be discussed how it forms solid conductive regions on ceramic bodies when baked. The discussion will make clear that the use of zinc powder as the main ingredient of the paste is no arbitrary choice but an outcome of extensive experimentation.

Figure 1:
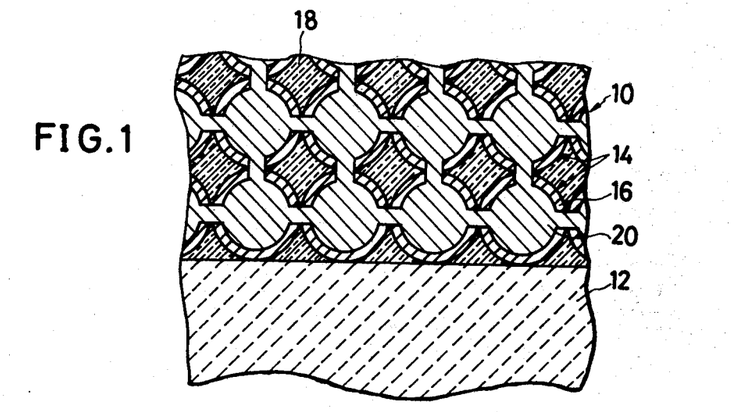
FIG. 1 is a fragmentary sectional view diagrammatically illustrating, on a greatly magnified scale, a conductive layer or electrode formed on a ceramic body by baking a coating of the zinc paste of this invention, the view being explanatory of the way in which the unoxidized interiors of the zinc particles become fused to each other on baking.

An inspection of FIG. 1 will reveal the unique behavior of the zinc paste on being baked. This figure is a greatly enlarged, fragmentary section through, for instance, a ceramic capacitor comprising a conductor 10 and a ceramic body 12. The conductor 10 is made from the zinc paste, coated on the ceramic body 12 and baked for several tens of minutes at a temperature above the melting point, 419.5° C., of the zinc powder. When so treated, each zinc particle 14 is oxidized and bears an oxide cladding 16. The oxidation of the zinc powder does not proceed deep into each particle 14 as the organic titanium compound 18 fills the interstices of the zinc powder. Further, while the zinc paste coating is being baked, the unoxidized interiors 20 of the zinc particles 14 melt and expand at a greater rate than their oxide claddings 16, until the zinc interiors disrupt the oxide claddings and become fused to each other to form the integrated conductor 10. Thus the zinc paste is well suited as a material for the conductors or electrodes of some electrical ceramic components. It may be noted that the fusion of the unoxidized interiors of the zinc particles to each other on baking involves a process different from the cohesion of metal particles by sintering.

As has been mentioned, the zinc paste of this invention may additionally comprise from about 0.01 to 5.00 weight parts of one or more of such additives as lead (Pb), bismuth (Bi), praseodymium (Pr), copper (Cu), cadmium (Cd), and the compounds of each of these metallic elements. The zinc paste containing such an additive or additives, when baked on ceramic bodies, will adhere thereto more firmly. If used for ceramic capacitors, moreover, the zinc paste with such an additive or additives will afford higher capacitance and smaller dielectric loss tangent.

Preferred examples of the additives are the oxides of the listed metallic elements such as red lead oxide ($Pb_3O_4$), bismuth trioxide ($Bi_2O_3$), praseodymia ($Pr_6O_{11}$), black copper oxide (CuO), and cadmium oxide (CdO), all with a particle size ranging from 0.1 to 15.0 microns. Uncompounded metals such as those enumerated above are adoptable as well, however. The metals will be converted into oxides upon baking of the zinc paste. Additional examples of additives are litharge, PbO; lead dioxide, $PbO_2$; lead tetraacetate, $Pb(CH_3COO)_4$; $Pr_2(C_2H_4O_2)_3$; red copper oxide, $Cu_2O$; and bismuth citrate, $BiC_6H_5O_7$. The hydroxides, salts such as carbonates and oxalates, and peroxides of the metallic elements may also be employed. In short the zinc paste may contain any additive that will become a metal oxide when the paste is baked in a temperature range of 500° to 900° C. for 10 to 50 minutes.

Experiment has proved that if the proportion of the additive or additives is less than about 0.01 weight part, no substantial improvements result in such properties of the electrical components concerned as capacitance, dielectric loss tangent, and the strength with which the conductive regions adhere to the ceramic bodies against tensile loading. Also, such properties will fluctuate from batch to patch of the zinc paste on mass production. If the amount of the additive or additives exceeds about five weight parts, on the other hand, the tensile strength will decrease, and the dielectric loss tangent in particular will deteriorate.

Described hereinbelow are specific Examples of the invention, dealing with various zinc pastes as actually produced in accordance with the principles of the invention, and with the physical properties of ceramic capacitors and varistors having their conductors or electrodes fabricated from the zinc pastes. These Examples, however, are meant purely to illustrate or explain and not to impose limitations upon the invention.

EXAMPLES 1-5

To 100 parts by weight of zinc powder there was added an organic titanium compound in five different proportions set forth in Table 1, ranging from 0.01 to 15.00 weight parts. About 20 weight % of a vehicle was admixed with the mixtures of zinc powder and titanium compound, and the admixtures were agitated for 15 hours, thus preparing the five zinc pastes of Examples 1 to 5.

The zinc powder in use was of spherical particles with a diameter up to 15 microns and was of such purity as to contain about 0.01 weight % of impurities such as cadmium and iron. The organic titanium compound in use was the powder of tetrakisstearoxytitanium with a particles size up to 30 microns. (The zinc and tetrakisstearoxytitanium powders used in the other Examples presented subsequently are of the same grades as above.) As the vehicle there was employed alphaterpineol admixed with five weight % ethylcellulose as an organic binder. (The same vehicle was used in all the following Examples.)

Figure 2:
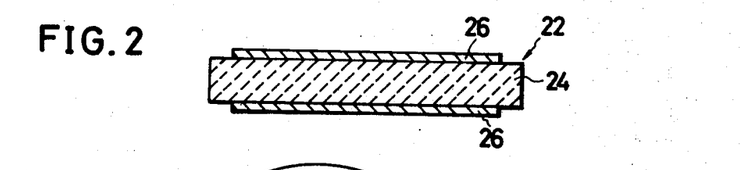
FIG. 2 is a diametrical section through a ceramic capacitor having conductors fabricated from the zinc paste.

The above prepared five examples of the zinc paste were each coated on opposite faces of ten identical discs of semiconducting ceramic material composed principally of strontium titanate, $SrTiO_3$, and were baked thereon. FIG. 2 is a section through each ceramic capacitor 22 thus fabricated, showing the ceramic disc 24 and the pair of zinc conductors 26 on its opposite faces. A more detailed description of the ceramic capacitors and the method of their fabrication follows.

The ceramic discs 24 of the capacitors 22 were prepared from a mixture of 98.8 mole % strontium titanate, 0.8 mole % germanium dioxide, $GeO_2$, and 0.4 mole % niobium oxide, $Nb_2O_5$, admixed with polyvinyl alcohol as an organic binder. After having been agitated, the mixture was molded into discs at a pressure of approximately one ton per square centimeter. The disclike moldings were baked for three hours at a temperature of 1420° C. in a furnace, with a gaseous atmosphere of 98% by capacity of molecular nitrogen ($N_2$) and 2% by capacity of molecular hydrogen ($H_2$). The ceramic discs thus formed had each a diameter of 8 millimeters (mm) and a thickness of 0.4 mm. The discs were then coated with a glass paste composed of litharge, boric oxide ($B_2O_3$), and bismuth trioxide. The coated ceramic discs were heated to 1200° C. for three hours, thereby causing diffusion of the glass ingredients into the ceramic to insulate its particles.

For the fabrication of the conductors on the opposite faces of each ceramic disc one of the zinc pastes of the above specified compositions was first printed on one face of the disc through a 200-mesh Teflon (trademark) screen. The coated discs were placed in a drying furnace for drying the coatings at 150° C. for 10 minutes. Then the zinc paste was coated on the other face of each disc, and the coating was dried in the same manner. Then, placed on an iron net, the ceramic discs with the dried coatings were introduced into a tunnel-shaped heater, in which the coatings were baked at approximately 700° C., higher than the melting point of zinc, for 10 minutes in exposure to atmosphere. The coated ceramic discs were held in the heater for 40 minutes including the time for raising and lowering its temperature. There were thus completed the conductors 26 of FIG. 2, each having a diameter of 7.8 mm and a thickness of 15.0 microns.

As has been explained in connection with FIG. 1, the heating of the zinc paste coatings in atmosphere, as above, causes oxidation of the zinc particles. Being surrounded by the titanium compound, however, the individual zinc particles are oxidized only to minimal thicknesses from their surfaces. Also the baking temperature of the zinc paste in accordance with the invention is higher than the melting point of zinc, unlike that of the conventional silver paste which is less than the melting point of silver. Thus the unoxidized interiors of the zinc particles melt and, disrupting the oxide claddings, become bridged to each other to form the conductors 26.

Although the oxide films also exist at the exposed surfaces of the zinc particles and at the interfaces between the zinc conductors and ceramic body of each capacitor, they are too thin to present any serious electrical or mechanical problems. However, if a difficulty is encountered in soldering leads to the conductors, the oxide films may be removed from their exposed surfaces, and these surfaces may be covered with a metal layer that will not easily oxidize.

During such baking of the zinc paste coatings on the ceramic discs the vehicle of the paste evaporates, and the organic titanium compound (tetrakisstearoxytitanium in this case) is decomposed and, either in part or in whole, converted into a titanium oxide. It is thus seen that the titanium compound functions as both inorganic binder and oxidation inhibitor.

The ceramic capacitors with the zinc conductors prepared as above were tested as to capacitance, dielectric loss tangent, and the strength with which the conductors are attached to the ceramic discs against tensile loading. Table 1 gives the results. In this and all the succeeding tables each listed value is the average of ten samples. Also, in all the tables given herein, the capacitance represents the values measured at a frequency of 1 kHz, in nanofarads (nF), and the dielectric loss tangent represents 100 times the values measured at 1 kHz. For the actual values of dielectric loss tangent, therefore, the tabulated numbers should be multiplied by $10^{-2}$.

Figure 3:
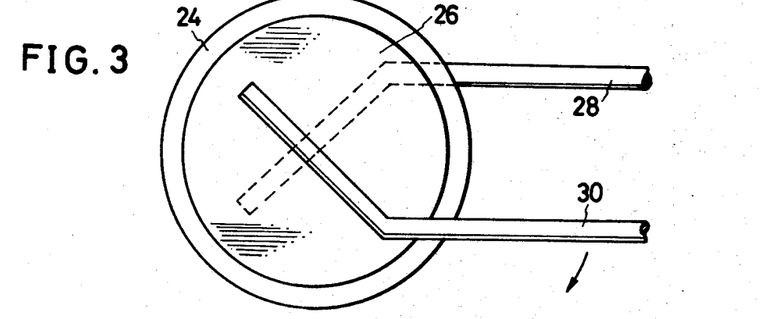
FIG. 3 is a plan view explanatory of the way in which the ceramic capacitor is tested as to the strength with which the conductors are bonded to the ceramic body.

FIG. 3 is explanatory of the method adopted for measurement of the tensile strength of the zinc conductors 26 on the ceramic discs 24 of the capacitors. For each capacitor there were prepared two annealed copper wires 28 and 30, each 0.6 mm in diameter and 35.0 mm in length, and each bent at a point approximately 4 mm from one end, as shown. The bent end portion of each wire was soldered to one of the conductors 26 of each capacitor with application of ultrasonic vibration. Then, with one wire 28 held against movement, the other 30 was pulled slowly via a spring scale in the arrow marked direction, until either of the conductors came off the ceramic disc 24. The reading in kilograms (kg) of the spring scale at that moment is given as the tensile strength.

TABLE 1

| Examples | $Ti(OC_{17}H_{35})_4$ (organic titanium compound) content, weight part | Capacitor properties | | |
|---|---|---|---|---|
| | | Capacitance, nF | Dielectric loss tangent, $\times 10^{-2}$ | Tensile strength, kg |
| 1 | 0.01 | 54 | 1.49 | 1.1 |
| 2 | 1.0 | 59 | 1.00 | 1.7 |
| 3 | 5.0 | 59 | 1.03 | 1.6 |
| 4 | 10.0 | 56 | 1.34 | 1.5 |
| 5 | 15.0 | 54 | 1.43 | 1.0 |

By way of comparison there was prepared a silver paste composed of 60 weight % of spherical silver particles sized 0.1 to 3.0 microns, two weight % PbO—$B_2O_3$—$SiO_2$ glass frit with a softening point of 550° C., and 20 weight % of a vehicle, in accordance with the prior art. The silver paste was coated on opposite faces of strontium titanate ceramic discs identical with those used in Examples 1-5. As had been conventionally practiced with the silver paste, the coatings on the ceramic discs were baked at a temperature less than the melting point of silver, to form conductors each with a diameter of 7.8 mm and a thickness of three microns. Measured under the same conditions as those specified above, the capacitance of the thus fabricated conventional capacitors averaged 47 nF, their dielectric loss tengent $0.56 \times 10^{-2}$, and the tensile strength of their conductors 1.5 kg.

From these values, and in consideration of the characteristics of the capacitors with the silver conductors, the acceptable criteria of the three properties in question for any capacitors with strontium titanate ceramic bodies will now be determined as follows: capacitance, not less than 47 nF; dielectric loss tengent, not more than $1.5 \times 10^{-2}$; and tensile strength, not less than 0.5 kg.

A consideration of Table 1 will reveal that the capacitors having their conductors made from the zinc pastes containing from about 0.01 to 15.00 weight parts of tetrakisstearoxytitanium (organic titanium compound) with respect to 100 weight parts of zinc powder in accordance with the invention all satisfy the above determined criteria of capacitance, dielectric loss tangent, and tensile strength. Consider the capacitor of Example 2 in particular, with its conductors fabricated from the zinc paste containing one weight part of the organic titanium compound. Although its dielectric loss tangent is slightly worse, the capacitance and tensile strength are better than the acceptable criteria by as much as 12 nF and 1.2 kg, respectively. This makes it possible to reduce the size of capacitors of this class for a given capacitance. Further, since the zinc paste of this invention allows baking in atmosphere for the reason already stated, the capacitors are mass producible, and at drastically reduced costs because of the cheapness of zinc compared with silver.

EXAMPLES 6-25

As specified in Table 2, various proportions of tetrakisstearoxytitanium powder as an organic titanium compound, ranging from 0.01 to 15.00 weight parts, and various proportions of red lead oxide powder as an additive, ranging from 0.01 to 5.00 weight parts, were added to 100 weight parts of zinc powder. The red lead oxide powder had a particle size from 0.1 to 15.0 microns. Approximately 20 weight % of the vehicle set forth in Embodiments 1-5 was admixed with the various mixtures of the noted three ingredients. The admixtures were agitated to prepare the twenty zinc pastes of Examples 6-26. With use of these zinc pastes, capacitors were made through the procedure of Examples 1-5, and their capacitance, dielectric loss tangent, and tensile strength were measured by the same methods as in Examples 1-5. Table 2 represents the results.

TABLE 2

| | Paste ingredients | | Capacitor properties | | |
|---|---|---|---|---|---|
| | $Ti(OC_{17}H_{35})_4$ | $Pb_3O_4$ | | | |
| | (organic titanium compound) content, weight part | (additive) content, weight part | Capacitance, nF | Dielectric loss tangent, $\times 10^{-2}$ | Tensile strength, kg |
| Examples | | | | | |
| 6 | 0.01 | 0.01 | 54 | 1.48 | 1.1 |
| 7 | 0.01 | 0.10 | 60 | 0.92 | 1.1 |
| 8 | 0.01 | 1.00 | 61 | 0.82 | 1.2 |
| 9 | 0.01 | 5.00 | 55 | 1.44 | 1.1 |
| 10 | 1.00 | 0.01 | 60 | 0.91 | 1.5 |
| 11 | 1.00 | 0.10 | 64 | 0.52 | 1.6 |
| 12 | 1.00 | 1.00 | 63 | 0.56 | 1.8 |
| 13 | 1.00 | 5.00 | 57 | 1.23 | 1.5 |
| 14 | 5.00 | 0.01 | 59 | 1.01 | 1.6 |
| 15 | 5.00 | 0.10 | 61 | 0.83 | 1.9 |
| 16 | 5.00 | 1.00 | 63 | 0.61 | 1.7 |
| 17 | 5.00 | 5.00 | 57 | 1.11 | 1.5 |
| 18 | 10.00 | 0.01 | 56 | 1.27 | 1.5 |
| 19 | 10.00 | 0.10 | 58 | 1.11 | 1.6 |
| 20 | 10.00 | 1.00 | 60 | 0.93 | 1.7 |
| 21 | 10.00 | 5.00 | 56 | 1.40 | 1.4 |
| 22 | 15.00 | 0.01 | 54 | 1.42 | 1.0 |
| 23 | 15.00 | 0.10 | 57 | 1.29 | 1.1 |
| 24 | 15.00 | 1.00 | 59 | 1.01 | 1.2 |
| 25 | 15.00 | 5.00 | 54 | 1.47 | 1.1 |

The tabulated results indicate that the addition of red lead oxide improves all the three properties of the capacitors, and in particular the dielectric loss tangent and the tensile strength. The reason for this seems to be the improved state of the interfaces between the ceramic bodies and conductors of the capacitors due to the addition of red lead oxide. The proportion of red lead oxide should range from about 0.01 to 5.00 weight parts, preferably from 0.1 to 1.0 weight part. Should the content of the additive fall outside the range of 0.01 to 5.00 weight parts, the dielectric loss tangent of the resulting capacitors would exceed the acceptable maximum of $1.5 \times 10^{-2}$.

EXAMPLES 26-45

As specified in Table 3, various proportions of tetrakisstearoxytitanium powder as an organic titanium compound, ranging from 0.01 to 15.00 weight prts, and various proportions of bismuth trioxide powder as an additive, ranging from 0.01 to 5.00 weight parts, were added to 100 weight parts of zinc powder. The bismuth trioxide powder had a particle size from 0.1 to 15.0 microns. About 20 weight % of the same vehicle as in Examples 1-5 was admixed with the various mixtures of the above three ingredients. By agitating the admixtures there were prepared the twenty different zinc pastes of Examples 26-45.

With use of these zinc pastes, capacitors were fabricated through the same procedure as in Examples 1-5, and their capacitance, dielectric loss tangent, and tensile strength were measured by the same methods as in Examples 1-5. Table 3 represents the results.

TABLE 3

| Examples | Paste ingredients | | Capacitor properties | | |
|---|---|---|---|---|---|
| | Ti(OC$_{17}$H$_{35}$)$_4$ (organic titanium compound) content, weight part | Bi$_2$O$_3$ (additive) content, weight part | Capacitance, nF | Dielectric loss tangent, $\times 10^{-2}$ | Tensile strength, kg |
| 26 | 0.01 | 0.01 | 55 | 1.45 | 1.1 |
| 27 | 0.01 | 0.10 | 57 | 1.16 | 1.2 |
| 28 | 0.01 | 1.00 | 58 | 1.09 | 1.2 |
| 29 | 0.01 | 5.00 | 54 | 1.47 | 1.1 |
| 30 | 1.00 | 0.01 | 62 | 0.72 | 1.7 |
| 31 | 1.00 | 0.10 | 62 | 0.69 | 1.8 |
| 32 | 1.00 | 1.00 | 64 | 0.52 | 1.6 |
| 33 | 1.00 | 5.00 | 56 | 1.28 | 1.5 |
| 34 | 5.00 | 0.01 | 57 | 1.16 | 1.8 |
| 35 | 5.00 | 0.10 | 59 | 1.03 | 1.9 |
| 36 | 5.00 | 1.00 | 59 | 0.91 | 1.8 |
| 37 | 5.00 | 5.00 | 56 | 1.36 | 1.7 |
| 38 | 10.00 | 0.01 | 57 | 1.33 | 1.6 |
| 39 | 10.00 | 0.10 | 56 | 1.20 | 1.6 |
| 40 | 10.00 | 1.00 | 59 | 1.00 | 1.6 |
| 41 | 10.00 | 5.00 | 55 | 1.41 | 1.5 |
| 42 | 15.00 | 0.01 | 55 | 1.42 | 1.2 |
| 43 | 15.00 | 0.10 | 55 | 1.13 | 1.2 |
| 44 | 15.00 | 1.00 | 58 | 1.10 | 0.9 |
| 45 | 15.00 | 5.00 | 54 | 1.48 | 0.6 |

It will be observed from Table 3 that the addition of bismuth trioxide gives just as favorable results as does the addition of red lead oxide as in Examples 6–26. The proportion of bismuth trioxide in any zinc mixture in accordance with the invention should also be in the range of about 0.01–5.00 weight parts, preferably 0.1–1.0 weight part. Should this additive be used in an amount outside the range of 0.01–5.00 weight parts, the dielectric loss tangent of the resulting capacitors would exceed the acceptable maximum of $1.5 \times 10^{-2}$.

EXAMPLES 46–65

To 100 weight parts of zinc powder there were added various proportions of tetrakisstearoxytitanium powder as an organic titanium compound, ranging from 0.01 to 15.00 weight parts, and various proportions of powdered praseodymia, Pr$_6$O$_{11}$, as an additive, ranging from 0.01 to 5.00 weight parts, as specified in Table 4. The praseodymia powder had a particle size from 0.1 to 15.0 microns. The various mixtures of these three ingredients were admixed with about 20 weight % of the same vehicle as used in Examples 1–5. The admixtures were agitated to prepare the twenty different zinc pastes of Examples 46–65.

By use of these zinc pastes, capacitors were fabricated through the same procedure as in Examples 1–5, and their capacitance, dielectric loss tangent, and tensile strength were measured by the same methods as in Examples 1–5. Table 4 represents the results.

TABLE 4

| Examples | Paste ingredients | | Capacitor properties | | |
|---|---|---|---|---|---|
| | Ti(OC$_{17}$H$_{35}$)$_4$ (organic titanium compound) content, weight part | Pr$_6$O$_{11}$ (additive) content, weight part | Capacitance, nF | Dielectric loss tangent, $\times 10^{-2}$ | Tensile strength, kg |
| 46 | 0.01 | 0.01 | 56 | 1.36 | 1.1 |
| 47 | 0.01 | 0.10 | 60 | 1.01 | 1.3 |
| 48 | 0.01 | 1.00 | 60 | 0.91 | 1.2 |
| 49 | 0.01 | 5.00 | 55 | 1.41 | 1.0 |
| 50 | 1.00 | 0.01 | 59 | 1.01 | 1.6 |
| 51 | 1.00 | 0.10 | 63 | 0.57 | 1.7 |
| 52 | 1.00 | 1.00 | 62 | 0.58 | 1.7 |
| 53 | 1.00 | 5.00 | 59 | 0.97 | 1.6 |
| 54 | 5.00 | 0.01 | 59 | 1.04 | 1.8 |
| 55 | 5.00 | 0.10 | 60 | 0.91 | 1.8 |
| 56 | 5.00 | 1.00 | 60 | 0.93 | 1.7 |
| 57 | 5.00 | 5.00 | 57 | 1.23 | 1.6 |
| 58 | 10.00 | 0.01 | 57 | 1.00 | 1.6 |
| 59 | 10.00 | 0.10 | 57 | 1.18 | 1.6 |
| 60 | 10.00 | 1.00 | 57 | 1.20 | 1.7 |
| 61 | 10.00 | 5.00 | 56 | 1.30 | 1.5 |
| 62 | 15.00 | 0.01 | 56 | 1.43 | 1.0 |
| 63 | 15.00 | 0.10 | 57 | 1.39 | 1.1 |
| 64 | 15.00 | 1.00 | 57 | 1.22 | 1.2 |
| 65 | 15.00 | 5.00 | 54 | 1.46 | 1.1 |

It will be seen from Table 4 that the addition of Pr$_6$O$_{11}$ provides just as favorable results as does the addition of red led oxide as in Examples 6–25. The proportion of Pr$_6$O$_{11}$ in any zinc mixture in accordance with the invention should be in the range of about 0.01–5.00 weight parts, preferably 0.1–1.0 weight part. Should the proportion of the additive fall outside the range of 0.01–5.00 weight parts, the dielectric loss tengent of the resulting capacitors would exceed the allowable maximum of $1.5 \times 10^{-2}$.

EXAMPLES 66-77

These Examples were intended to ascertain the results of the use of two or more of the above enumerated additives in the zinc paste of this invention. Thus, to 100 weight parts of zinc powder, there were added various proportions of tetrakisstearoxytitanium as an organic titanium compound, ranging from 0.01 to 15.00 weight parts, and 0.1 weight part each of two or more of the powders of red lead oxide, bismuth trioxide, praseodymia, black copper oxide, and cadmium oxide as additives. The various mixtures of these four or more ingredients were admixed with about 20 weight % of the same vehicle as used in Examples 1-5. The admixtures were agitated for 15 hours to prepare the twelve different zinc pastes of Examples 66-77.

By use of these zinc pastes, capacitors were made through the same prodcedure as in Examples 1-5, and their capacitance, dielectric loss tangent, and tensile strength were measured also by the same methods as in Examples 1-5. Table 5 represent the results.

TABLE 5

| | Paste ingredients | | Capacitor properties | | |
|---|---|---|---|---|---|
| Examples | $Ti(OC_{17}H_{35})_4$ content, weight part | Additives (Each 0.1 weight part) | Capacitance, nF | Dielectric loss tangent, $\times 10^{-2}$ | Tensile strength, kg |
| 66 | 0.01 | $Pb_3O_4$ & $Bi_2O_3$ | 60 | 0.90 | 1.1 |
| 67 | 0.01 | $Bi_2O_3$, $Pr_6O_{11}$ | 60 | 0.89 | 1.1 |
| 68 | 0.01 | $Bi_2O_3$, $Pr_6O_{11}$, CuO & CdO | 61 | 0.87 | 1.2 |
| 69 | 0.01 | $Pb_3O_4$, $Bi_2O_3$, $Pr_6O_{11}$, CuO & CdO | 61 | 0.84 | 1.2 |
| 70 | 0.05 | $Bi_2O_3$ & $Pr_6O_{11}$ | 61 | 0.86 | 1.5 |
| 71 | 0.50 | $Pr_6O_{11}$, CuO & CdO | 62 | 0.79 | 1.5 |
| 72 | 0.50 | $Pb_3O_4$, $Pr_6O_{11}$, CuO & CdO | 62 | 0.71 | 1.5 |
| 73 | 0.05 | $Pb_3O_4$, $Bi_2O_3$, $Pr_6O_{11}$, CuO & CdO | 63 | 0.64 | 1.6 |
| 74 | 15.00 | $Pr_6O_{11}$ & CuO | 57 | 1.25 | 1.0 |
| 75 | 15.00 | $Pb_3O_4$, CuO & CdO | 57 | 1.19 | 1.1 |
| 76 | 15.00 | $Pb_3O_4$, $Bi_2O_3$, CuO & CdO | 58 | 1.13 | 1.1 |
| 77 | 15.00 | $Pb_3O_4$, $Bi_2O_3$, $Pr_6O_{11}$, CuO & CdO | 59 | 1.07 | 1.1 |

As will be understood from Table 5, the use of two or more of the above powdered metal oxides as additives provides just as favorable results as in the previous embodiments. Although each zinc paste of Examples 66-77 contain a total of 0.2-0.5 weight part of additives, experiment has proved that the total proportion of the additives can be anywhere between about 0.01 and 5.00 weight parts.

The foregoing Examples do not include zinc pastes containing the powder of black copper oxide or cadmium oxide alone (both preferred examples of additives listed previously), in addition to zinc powder and an organic titanium compound. The following, then, is the description of experiments demonstrating that each of these two metal oxides is as effective as red lead oxide, bismuth trioxide, or praseodymia used in the above Examples.

There were prepared several mixtures composed of 100 weight parts of zinc powder, 0.01 to 15.00 weight parts of the organic titanium compound, and 0.01 to 5.00 weight parts of powdered black copper oxide. The mixtures were pasted by adding about 20 weight % of the same vehicle as used in Examples 1-5, and the pastes were agitated for 15 hours. Capacitors were fabricated by use of these zinc pastes through the same procedure as in Examples 1-5. Measured by the same methods as in Examples 1-5, the capacitance of the capacitors was in the range of 55-63 nF, their dielectric loss tangent in the range of $0.63 \times 10^{-2} - 1.47 \times 10^{-2}$, and the tensile strength of their zinc conductors in the range of 1.1-1.8 kg.

Mixtures were also prepared which were composed of 100 weight parts of zinc powder, 0.01 to 15.00 weight parts of the organic titanium compound, and 0.01 to 5.00 weight parts of cadmium oxide. These mixtures were pasted with about 20 weight % of the vehicle, and the pastes were agitated for 15 hours. Capacitors were produced by use of these zinc pastes through the same procedure as in Examples 1-5. Measured by the same methods as in Examples 1-5, the capacitance of the capacitors was in the range of 55-63 nF, their dielectric loss tangent in the range of $0.63 \times 10^{-2} - 1.46 \times 10^{-2}$, and the tensile strength of their zinc conductors in the range of 1.1-1.8 kg.

Figure 4:
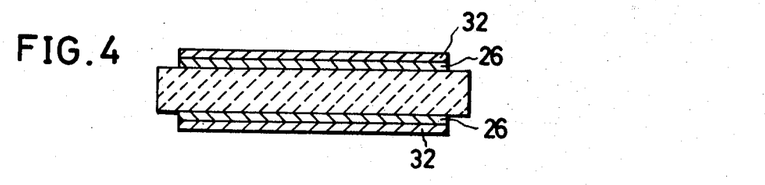
FIG. 4 is a diametrical section through another example of ceramic capacitor having conductors made from the zinc paste.

The zinc conductors on capacitors in accordance with the invention are less solderable than the conventional silver conductors. The solderability of the zinc conductors is easy to improve, however. Since zinc has a comparatively high ionization tendency, a less ionizable metal such as copper or nickel may be attached to the zinc conductors by electroless plating. FIG. 4 shows at 32 such platings of more solderable metal on the zinc conductors 26 of capacitors. Alternatively such solderable overlayers may be formed by the plating, vapor deposition, or coating of gold or silver. The use of the precious metals will not significantly add to the cost of the capacitors since the overlayers can be of minimal thickness.

EXAMPLES 78-79

These Examples deal with the applicability of the zinc pastes in accordance with the invention to the electrodes of ceramic varistors. The zinc pastes tested were of the compositions identical with those of Examples 1–5 and 26–45.

First, for the preparation of varistors, there was formed a mixture of 99.6 mole % titanium dioxide, $TiO_2$, 0.2 mole % niobium oxide, $Nb_2O_5$, and 0.2 mole % manganese dioxide, $MnO_2$, to which there was added a solution of polyvinyl alcohol as an organic binder. The mixture was molded into discs, and these were baked in a reductive atmosphere.

Each ceramic disc thus fabricated had a diameter of 8 mm and a thickness of 0.8 mm. Then the zinc pastes of Examples 1–5 and 26–45 were coated on the ceramic discs, and the coatings were baked at 750° C. for ten minutes in a tunnel-shaped heater in exposure to atmosphere, thereby completing varistor electrodes on the ceramic discs. The coated ceramic discs were held in the heater for a total of 40 minutes including the time required for raising and lowering the temperature of the heater.

In order to ascertain the properties of the varistors thus prepared, there were measured the voltage $E_{10}$ of each varistor when a current of 10 milliamperes (mA) flows therethrough, and the voltage $E_1$ when a current of 1 mA flows therethrough. From these voltages $E_{10}$ and $E_1$ the nonlinearity coefficient $\alpha$ was computed by the equation, $$\alpha = 1/\log \frac{E_{10}}{E_1}.$$

Also, in order to determine the strength with which the zinc electrodes of the varistors adhere to the ceramic discs, a copper wire of 60.0 mm in length and 0.6 mm in diameter was soldered perpendicularly to the center of one of the electrodes of each varistor, with use of approximately 50 mg of solder and by application of ultrasonic vibration. With the ceramic disc of each varistor held against movement, the wire was pulled via a spring scale until the electrode came off the disc. The reading in kg of the spring scale at that time was recorded as the tensile strength T.

Table 6 gives the results of these tests. In this table Example 78 combinedly represents the values exhibited by the varistors using the zinc pastes of Examples 1–5, and Example 79 combinedly represents the values exhibited by the varistors using the zinc pastes of Examples 26–45.

TABLE 6

| Examples | Pastes in use | Varistor properties $E_{10}$, V | $\alpha$ | T, kg |
|---|---|---|---|---|
| 78 | Examples 1–5 | 9.7–10.1 | 3.0–3.2 | 1.1–2.1 |
| 79 | Examples 26–45 | 9.6–10.4 | 3.0–3.3 | 0.9–1.9 |

By way of comparison a silver paste of the composition set forth in connection with Examples 1–5 was coated on a ceramic disc, which had itself been fabricated as in Examples 78 and 79. The coatings were baked at a temperature less than the melting point of silver. Measured by the same methods as above, the voltage $E_{10}$ of the varistor was 10.5 V, its nonlinearity coefficient $\alpha$ 3.3, and the tensile strength T of the electrodes 1.8 kg. A comparison of these values with those of Table 6 will show that the varistors with the zinc electrodes in accordance with the invention have approximately the same properties as does the varistors with the conventional silver electrodes.

Figure 5:
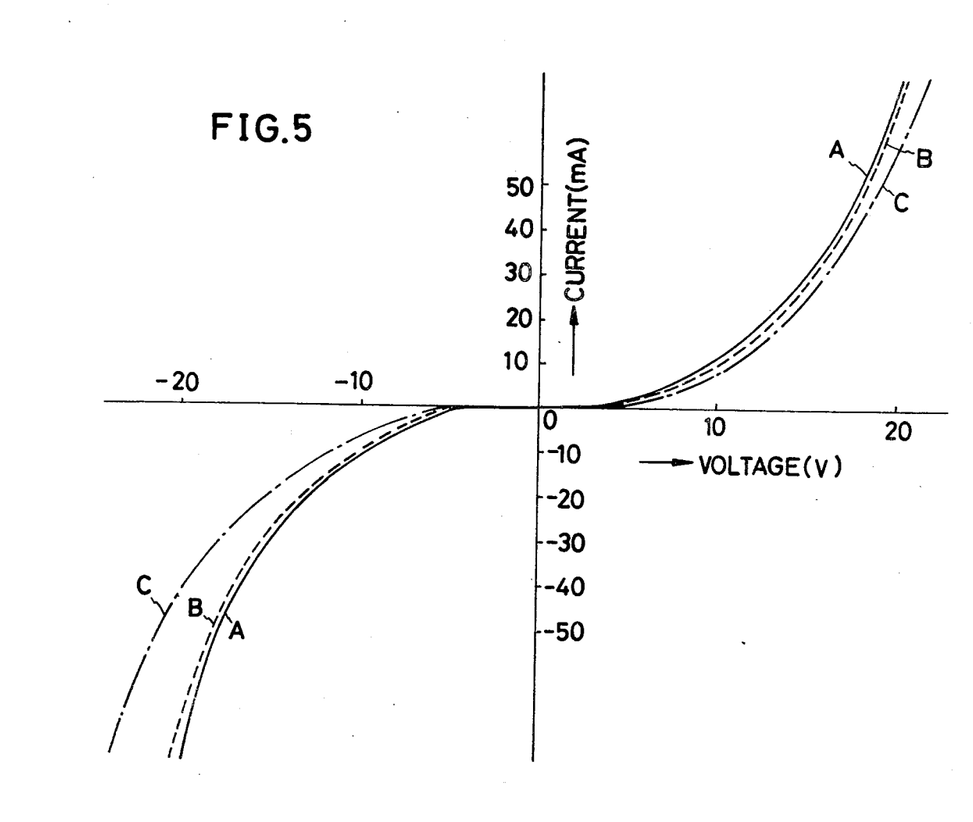
FIG. 5 is a graphic representation of the volt-ampere characteristics of some ceramic varistors having electrodes prepared in accordance with the principles of the invention and with the prior art.

For a study of the ohmic contact between the zinc electrode and ceramic body of a varistor, an electrode was formed on one face of a ceramic disc by use of the zinc paste of Example 1. An electrode of indium-gallium alloy was formed on the other face of the ceramic disc. The curve A of FIG. 5 plots the volt-ampere characteristic of the thus fabricated varistor.

Two other varistors were prepared by way of comparison, one having indium-gallium electrodes on opposite faces of a ceramic disc and the other having a silver electrode and an indium-gallium electrode on the opposite faces of a ceramic disc. The curves B and C of FIG. 5 represent the volt-ampere characteristics of the varistor with the indium-gallium electrodes and the varistor with the silver electrode and indium-gallium electrode. As will be noted from comparison of the curves A and C, the zinc electrode makes better ohmic contact with the ceramic than does the silver electrode.

EXAMPLE 80

To 100 weight parts of zinc powder there were added (1) five weight parts of di-i-propoxybisacetylacetonatetitanium as an organic titanium compound, and (2) 0.5 weight part of a mixture in one-to-one weight ratio of a glass frit of litharge and boric oxide and another glass frit of litharge, boric oxide and silica. The softening point of the first mentioned glass frit is 415° C., and that of the second 560° C. This mixture was pasted by use of the same vehicle as in Examples 1–5, and the pasted mixture was then agitated. By use of this zinc paste, capacitors were produced through the procedure of Examples 1–5. The capacitance of the capacitors averaged 64 nF, their dielectric loss tangent $0.5 \times 10^{-2}$, and the tensile strength of the electrodes 1.2 kg.

Although the zinc paste of this invention has been disclosed in terms of its specific examples and applications thereof, it is understood that these are meant purely to illustrate or explain and not to impose limitations upon the invention, since a variety of modifications or variations will occur to the specialists on the basis of this disclosure. For instance, instead of the glass frits used in Example 80, 0.01–10.00 weight parts of a glass frit composed of litharge, boric oxide, and silica, with a softening point ranging from 400° to 600° C., could be added to 100 weight parts of zinc powder and a suitable amount of an organic titanium compound, provided that the sum of the contents of the glass frit and the organic titanium compound did not exceed 15 weight parts. It will of course be seen that the solderable overlayers 32 of FIG. 4 can be formed not only on the zinc conductors of capacitors but also on the zinc electrodes of varistors.

The applications of the zinc paste are also not limited to those disclosed herein. Additional examples of possible applications include the conductors or electrodes of titanium dioxide ceramic capacitors, barium titanate ceramic capacitors, barium titanate ceramic thermistors, and barium titanate piezoelectric elements.

Thus the invention advocates the fundamental composition of the zinc paste itself and is to be limited only by the terms of the claims which follow.

We claim:

1. A method of forming a conductive electrode on a ceramic substrate to form a capacitor or the like, comprising the steps of:

applying an electroconductive paste to said ceramic substrate, said paste comprising about 100 parts of zinc powder, from about 0.01 to 15.00 parts by weight of an organic titanium compound, and an organic vehicle for pasting the mixture of the zinc powder and the organic titanium;

baking said ceramic substrate with the paste thereon to drive off the organic vehicle, whereby said organotitanium compound inhibits the oxidation of said zinc during said baking step, so that the unoxidized interiors of the zinc particles expand, breaking the oxide coatings thereon and are fused to one another, whereby an electrical conductor is formed of said zinc powders.

2. The method of claim 1 wherein the zinc powder is of substantially spherical particles.

3. The method of either of claims 1 or 2, wherein the zinc powder has a particle size ranging from about 0.1 to 30.0 microns.

4. The method of claim 1 wherein the organic titanium compound is selected from the class consisting of tetrakisstearoxytitanium, tetrabutoxytitanium, di-n-butoxydibenzyltitanium, di-i-propoxybisacetylacetonatetitanium, di-n-butoxybistriethanolaminatetitanium, and dihydroxybislactatetitanium.

5. The method of claims 1 or 4, further comprising from about 0.01 to 5.00 parts by weight of an additive selected from the class consisting of lead, bismuth, prasedoymium, copper, cadmium, and the compounds of these metallic elements.

6. The method of claim 5 wherein the compounds are oxides.

7. The method of claim 6 wherein the oxides of the metallic elements include red lead oxide, bismuth trioxide, praseodymia, black copper oxide, and cadmium oxide.

* * * * *

UNITED STATES PATENT AND TRADEMARK OFFICE
CERTIFICATE OF CORRECTION

PATENT NO. : 4,460,622

DATED : July 17, 1984

INVENTOR(S) : Nobutatsu Yamaoka and Kazuo Sasazawa

It is certified that error appears in the above-identified patent and that said Letters Patent is hereby corrected as shown below:

Column 7, line 38: "tengent" should read --tangent--.

Column 8, line 6: "6-26" should read --6-25--.

Column 8, line 54: "prts" should read --parts--.

Column 10, line 61: "led" should read --lead--.

Column 10, lines 67 & 68: "tengent" should read --tangent--.

Column 11, line 18: "prodcedure" should read --procedure--.

Table 5, Example 67: After "$Pr_6O_{11}$" insert --& CuO--.

Table 5, Example 70: "0.05" should read --0.50--.

UNITED STATES PATENT AND TRADEMARK OFFICE
CERTIFICATE OF CORRECTION

PATENT NO. : 4,460,622

DATED : July 17, 1984

INVENTOR(S) : Nobutatsu Yamaoka and Kazuo Sasazawa

It is certified that error appears in the above-identified patent and that said Letters Patent is hereby corrected as shown below:

Table 5, Example 73: "0.05" should read --0.50--.

Column 14, line 37: "1.2 kg." should read --2.1 kg.--.

Signed and Sealed this

Fifteenth Day of January 1985

[SEAL]

Attest:

GERALD J. MOSSINGHOFF

Attesting Officer

Commissioner of Patents and Trademarks